(12) United States Patent
Durand et al.

(10) Patent No.: US 11,796,130 B2
(45) Date of Patent: Oct. 24, 2023

(54) SEALED AND THERMALLY INSULATING TANK

(71) Applicant: GAZTRANSPORT ET TECHNIGAZ, Saint Remy les Chevreuse (FR)

(72) Inventors: Francois Durand, Saint Remy les Chevreuse (FR); Sebastien Delanoe, Saint Remy les Chevreuse (FR); Guillaume Le Roux, Saint Remy les Chevreuse (FR); Vincent Berger, Saint Remy les Chevreuse (FR); Bertrand Bugnicourt, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 271 days.

(21) Appl. No.: 16/795,131

(22) Filed: Feb. 19, 2020

(65) Prior Publication Data
US 2020/0271273 A1   Aug. 27, 2020

(30) Foreign Application Priority Data

Feb. 21, 2019   (FR) ..................................... 1901781

(51) Int. Cl.
  *F17C 3/02*   (2006.01)
  *F17C 3/10*   (2006.01)
  *F17C 9/00*   (2006.01)
(52) U.S. Cl.
  CPC ............... *F17C 3/027* (2013.01); *F17C 3/10* (2013.01); *F17C 9/00* (2013.01);
(Continued)
(58) Field of Classification Search
  CPC .... F17C 3/027; F17C 3/10; F17C 9/00; F17C 2201/0185; F17C 2203/0604;
(Continued)

(56) References Cited

U.S. PATENT DOCUMENTS 7,464,658 B2 * 12/2008 Dhellemmes ........... F17C 3/027
                                                      220/901
7,555,991 B2 *  7/2009 Dhellemmes ........... B63B 25/16
                                                      220/901
(Continued)

FOREIGN PATENT DOCUMENTS

FR    2967130 A1 *  5/2012  ............. B63B 25/16
FR    2967130 A1    5/2012
(Continued)

OTHER PUBLICATIONS

FR 2967130 A1—English Translation (Year: 2010).*
(Continued)

*Primary Examiner* — Timothy P. Kelly
*Assistant Examiner* — Christopher M Afful
(74) *Attorney, Agent, or Firm* — Notaro, Michalos & Zaccaria P.C.

(57) ABSTRACT

A sealed and thermally insulating tank for storing a low-temperature liquefied gas, having an insulating box-section with a bottom panel coming into abutment on a support wall, by means of sealant beads disposed between the support wall and the bottom panel, the sealant beads being disposed in the form of at least one closed outline delimiting at least one confined space between the support wall and the bottom panel, the bottom panel having at least one through passage leading into the confined space to allow gas to circulate between the confined space and an internal space of the insulating box-section.

22 Claims, 3 Drawing Sheets

(52) U.S. Cl.
CPC ............... *F17C 2201/0185* (2013.01); *F17C 2203/0604* (2013.01); *F17C 2205/0352* (2013.01); *F17C 2221/033* (2013.01); *F17C 2221/035* (2013.01); *F17C 2270/0107* (2013.01)

(58) Field of Classification Search
CPC ........ F17C 2205/0352; F17C 2221/033; F17C 2221/035; F17C 2270/0107
USPC ............................................................ 141/1
See application file for complete search history.

(56) References Cited

U.S. PATENT DOCUMENTS

2009/0223974 A1* 9/2009 Felius ..................... F17C 3/022
220/560.12
2014/0124086 A1* 5/2014 Jean ....................... B65D 90/06
141/1
2017/0138537 A1* 5/2017 Sassi ....................... F17C 7/02
2017/0276295 A1* 9/2017 Herry ..................... B63B 25/08

FOREIGN PATENT DOCUMENTS

WO  2017/064426 A1  4/2017
WO    17064426 A1  4/2017
WO  2018/220331 A1  12/2018

OTHER PUBLICATIONS

Chinese office action for corresponding Chinese patent application No. 202010107547.7, dated Aug. 5, 2022.

European search report for corresponding European patent application No. EP 20 15 7691, dated Jun. 22, 2020.

French search report for corresponding French patent application No. 1901781, dated Oct. 9, 2019.

* cited by examiner

SEALED AND THERMALLY INSULATING TANK

TECHNICAL FIELD

The invention relates to the field of sealed and thermally insulating tanks with membranes. In particular, the invention relates to the field of sealed and thermally insulating tanks for storing and/or transporting low-temperature liquid, such as tanks for transporting Liquefied Petroleum Gas (also called LPG) having, for example, a temperature between −50° C. and 0° C., or for transporting Liquefied Natural Gas (LNG) at approximately −162° C. at atmospheric pressure. These tanks can be installed onshore or on a floating structure. In the case of a floating structure, the tank can be intended for transporting liquefied gas or for receiving liquefied gas used as fuel to propel the floating structure.

TECHNOLOGICAL BACKGROUND

Patent application WO17064426 A1 discloses a sealed and thermally insulating tank integrated in a support structure. The tank comprises a thermally insulating barrier and a sealed membrane supported by the thermally insulating barrier. The thermally insulating barrier comprises a plurality of insulating box-sections. Each insulating box-section comprises a bottom panel, side walls, a cover panel, and an insulating material surrounded by the panels and the side walls. The bottom panels of the insulating box-sections rest on the walls of the structure by means of sealant beads, so as to compensate for the gaps in the walls relative to a flat reference surface and to provide a sufficiently even support for the insulating box-sections. The sealant beads comprise parallel longitudinal beads and two transverse beads running alongside the ends of the parallel beads.

For safety reasons, the thermally insulating barrier must be completely placed in an inert atmosphere by circulating an inert gas. Thus, the inert gas can circulate through the box-sections since the lateral walls of the insulating box-sections comprise openings. Furthermore, in order to provide sufficient support for the bottom panel of an insulating box-section, particularly to withstand the static and dynamic pressure forces, sealant beads may need to be disposed over the entire or almost the entire length and/or width of the bottom panel. For this reason, and all the more so since the sealant beads are crushed when the insulating box-sections are installed on the walls of the support structure, the longitudinal and transverse sealant beads are likely to meet and to thus form closed outlines delimiting confined spaces between the bottom panel and the support wall.

SUMMARY

One idea behind the invention is to provide a sealed and thermally insulating tank, in which such confined spaces are not completely separated from the remainder of the thermally insulating barrier. Thus, an aim of the invention is to prevent the confined spaces from being deprived of an inert gas current.

To this end, the aim of the present invention is a sealed and thermally insulating tank for storing a low-temperature liquefied gas, integrated in a support structure, said tank comprising a tank wall fixed on a support wall of the support structure, the tank wall comprising, in the thickness direction, from the outside to the inside of the tank:

a thermally insulating barrier retained on the support wall, and a sealed membrane supported by the thermally insulating barrier, the thermally insulating barrier comprising a plurality of juxtaposed insulating box-sections, one of said or at least one of said insulating box-sections, or a plurality of or some of or each one of the insulating box-sections, comprises a cover panel forming a support surface for the sealed membrane, side panels and a bottom panel coming into abutment on the support wall, the bottom panel and the cover panel being established parallel to each other and parallel to the support wall, the side panels connecting the bottom panel to the cover panel so as to delimit an internal space of the insulating box-section, the internal space being filled with a gas-permeable heatproof lining, with through holes being provided in the side panels to allow gas to circulate between the internal space of the insulating box-section and an environment of the insulating box-section, wherein the bottom panel comes into abutment on the support wall, by means of sealant beads disposed between the support wall and the bottom panel in order to compensate for gaps in the support wall relative to a reference plane, the sealant beads being disposed in the form of at least one closed outline delimiting at least one confined space between the support wall and the bottom panel, the bottom panel comprising at least one through passage leading into said one or each at least one confined space to allow gas to circulate between said or each at least one confined space and the internal space of the insulating box-section.

A "low-temperature liquefied gas" is understood to be any body that is in the vapour state under normal pressure and temperature conditions and that has been placed in the liquid state by lowering its temperature.

According to one embodiment, the invention also provides an insulating box-section for a sealed and thermally insulating tank for storing a low-temperature liquefied gas, comprising a cover panel, side panels and a bottom panel, the bottom panel and the cover panel being established parallel to each other, the side panels connecting the bottom panel to the cover panel so as to delimit an internal space of the insulating box-section, the internal space being filled with a gas-permeable heatproof lining, through holes being provided in the side panels to allow a gas to circulate in the insulating box-section, wherein sealant beads are disposed on an external face of the bottom panel, the sealant beads being arranged in the form of at least one closed outline delimiting at least one closed zone on the external face, the bottom panel comprising at least one through passage connecting a first internal face to the external face and leading into said one or each at least one closed zone.

Furthermore, the tank and the box-section can have one or more of the following features, considered individually or in combination.

Such a box-section can assume different geometries. According to one embodiment, the box-section assumes the general shape of a rectangular parallelepiped.

According to one embodiment, the side panels comprise transverse side panels and longitudinal side panels, the transverse side panels being established perpendicular to the longitudinal side panels, the transverse side panels comprising the through holes.

According to one embodiment, the sealant beads comprise transverse beads and longitudinal beads, the transverse beads being disposed in line with the transverse side panels, and the longitudinal beads being disposed between the transverse beads. Thus, the sealant beads provide better support for the insulating box-section, while limiting the bending forces in the bottom panel in line with the transverse side panels.

According to one embodiment, longitudinal beads are disposed in line with the longitudinal side panels. Thus, the sealant beads provide better support for the insulating box-section, while limiting the bending forces in the bottom panel in line with the longitudinal side panels.

According to one embodiment, the one or each insulating box-section further comprises support spacers disposed in the internal space in order to divide the internal space into a plurality of compartments, the support spacers being established parallel to the longitudinal side panels, a support spacer being placed between two consecutive through holes. Thus, the sealant beads provide better support for the insulating box-section, while limiting the bending forces in the bottom panel in line with the support spacers.

Such a through passage can be produced in various manners.

According to one embodiment, longitudinal beads are disposed in line with the support spacers.

According to one embodiment, the at least one through passage comprises a groove passing through the one or each confined space, or passing through the one or each closed space.

According to one embodiment, the groove extends over an entire width of the bottom panel, i.e. from one edge to another edge of the bottom panel.

According to one embodiment, the groove extends parallel to the transverse side panels and is disposed so as to partition the bottom panel into two equal parts.

According to one embodiment, the width of the groove is between 2 and 12 mm, preferably between 4 and 8 mm, and ideally is 5 mm.

According to one embodiment, the bottom panel comprises a plurality of through passages assuming the shape of holes.

According to one embodiment, at least one of said holes leads into each confined space, or leads into each closed zone.

According to one embodiment, the diameter of said holes, or of at least one of said holes, is between 15 and 30 mm, and preferably between 25 and 30 mm.

According to one embodiment, the thermally insulating barrier is a secondary thermally insulating barrier and the sealed membrane is a secondary sealed membrane, and the tank wall further comprises a primary thermally insulating barrier disposed on the secondary sealed membrane and a primary sealed membrane supported by said primary thermally insulating barrier.

The gas-permeable heatproof lining can be produced in various manners. According to one embodiment, the heatproof lining comprises a non-structural lining.

According to one embodiment, the non-structural lining is selected from among perlite, glass wool, rock wool, open cell low-density polymer foam, pyrogenic silicas, aerogels, cellulose wadding, and mixtures thereof.

In the case of a lining in the form of powder, sachets made of gas-permeable fabric can be used to package the heatproof lining or pieces of gas-permeable fabric can be fixed in the box-section at the through passages in the bottom of the box-section to keep the insulation in powder form inside the box-section.

Such a tank can form part of an onshore storage installation, for example, for storing LNG, or can be installed in a floating, coastal or deep sea structure, in particular an LNG tanker vessel, a floating storage and regasification unit (FSRU), an offshore floating production and storage unit (FPSO), among others. Such a tank can also be used as a fuel tank in any type of vessel.

According to one embodiment, a vessel for transporting a cold liquid product comprises a double hull and an aforementioned tank disposed in the double hull.

According to one embodiment, the invention also provides a method for loading or offloading such a vessel, wherein a cold liquid product is routed through insulated pipelines, from or to a floating or onshore storage installation, to or from the tank of the vessel.

According to one embodiment, the invention also provides a transfer system for a cold liquid product, the system comprising the aforementioned vessel, insulated pipelines arranged so as to connect the tank installed in the hull of the vessel to a floating or onshore storage installation and a pump for inducing a flow of cold liquid product through the insulated pipelines, from or to the floating or onshore storage installation, to or from the tank of the vessel.

BRIEF DESCRIPTION OF THE FIGURES

The invention will be better understood, and further aims, details, features and advantages thereof will become more clearly apparent throughout the following description of a plurality of particular embodiments of the invention, which are provided solely by way of a non-limiting illustration, with reference to the accompanying drawings, in which.

DESCRIPTION OF THE EMBODIMENTS

Figure 1:
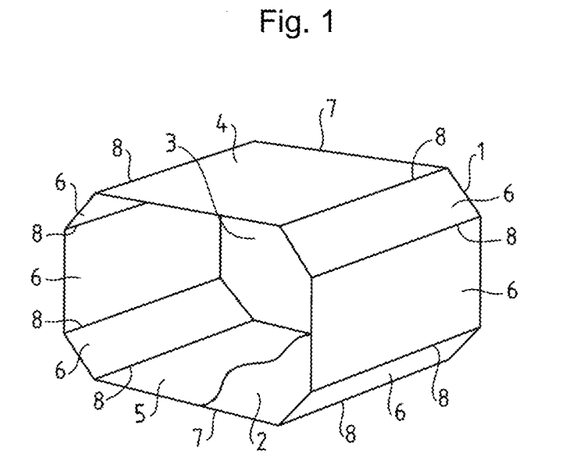
FIG. 1 is a partial schematic view of a support structure intended to receive the walls of a sealed and thermally insulating tank.

FIG. 1 shows the rear part of a support structure 1 intended to receive the walls of a sealed and thermally insulating tank. The support structure 1 is formed by the internal hull of a double hull vessel. The support structure 1 has a general polyhedric or prismatic shape. The support structure 1 has a front wall 2 and a rear wall 3, in this case of octagonal shape. In FIG. 1, the front wall 2 is only partially shown in order to allow the internal space of the support structure 1 to be shown. The front 2 and rear 3 walls are the cofferdam walls of the vessel and extend transverse to the longitudinal direction of the vessel. The support structure 1 also comprises an upper wall 4, a lower wall 5 and side walls 6. The upper wall 4, the lower wall 5 and the side walls 6 extend in the longitudinal direction of the vessel, connect the front 2 and rear 3 walls at edges 7, and meet at edges 8.

Figure 2:
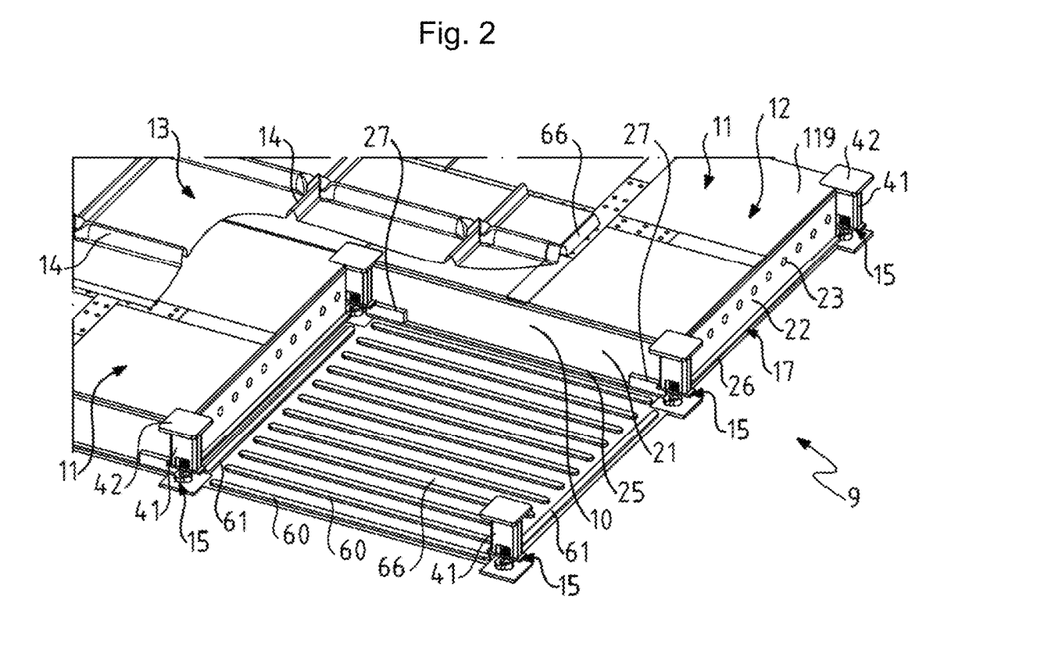
FIG. 2 is a perspective cutaway view of a wall of a sealed and thermally insulating tank supported by a support wall of FIG. 1.

As is schematically shown in FIG. 2, each wall 9 of the tank successively has, from the outside to the inside, in the thickness direction of the wall 9, a thermally insulating barrier 10 comprising insulating box-sections 11, a sealed membrane 12 resting on the insulating box-sections of the thermally insulating barrier 10. The sealed membrane 12 is intended to be in contact with the low-temperature liquefied gas contained in the tank, such as liquefied petroleum gas comprising butane, propane, propene or the like and having a temperature equilibrium between −50° C. and 0° C. This multi-layer structure of the tank can be disposed on each of the walls 2, 3, 4, 5, 6 of the support structure 1.

By convention, the adjective "upper" applied to an element of the tank denotes the part of this element that is oriented towards the inside of the tank and the adjective "lower" denotes the part of this element that is oriented towards the outside of the tank, irrespective of the orientation of the tank wall relative to the gravitational field of the earth. Similarly, the term "above" denotes a position located closer to the inside of the tank and the term "below" denotes a position located closer to the support structure, irrespective of the orientation of the tank wall relative to the gravitational field of the earth.

The insulating box-sections jointly form a flat surface, on which the sealed membrane 12 is anchored. These insulating box-sections 11 have a rectangular parallelepiped shape. They can assume, for example, the shape of a hexagonal prism or of a triangular prism. The insulating box-sections 11 are juxtaposed as an even rectangular mesh. The insulating box-sections 11 are anchored on the support wall by any suitable means, such as, for example, using anchoring components 15. The insulating box-sections 11 rest on the support wall by means of sealant beads 60, 61 forming straight parallel lines. These lines can also be corrugated.

Figure 3:
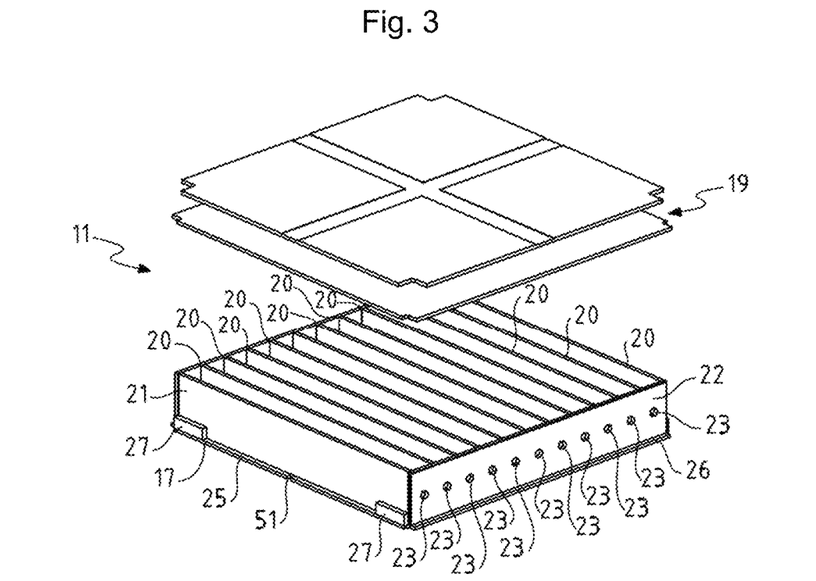
FIG. 3 is a partially exploded top view of an insulating box-section of the thermally insulating barrier according to a first embodiment, as a cavalier perspective.

With reference to FIG. 3, according to a first embodiment, the insulating box-section 11 comprises a bottom panel 17, side panels 21, 22 and a cover panel 19. All these panels 17, 21, 22, 19 are rectangular shaped and delimit an internal space of the insulating box-section 11. The bottom panel 17 and the cover panel 19 are established parallel to one another and parallel to the support wall 2, 3, 4, 5, 6. The side panels 21, 22 are established perpendicular to the bottom panel 17. The side panels 21, 22 connect the bottom panel 17 and the cover panel 19 over the entire periphery of the insulating block 11. The side panels 21, 22 comprise two longitudinal side panels 21 and two transverse side panels 22. The transverse side panels 22 that are established perpendicular to the longitudinal side panels 21 comprise through holes 23. These through holes 23 are intended to allow gas to circulate in the insulating box-section 11 and therefore in the thermally insulating barrier 10. When the tank is loaded, this gas can be nitrogen, for example.

Support spacers 20 are disposed between the bottom panel 17 and the cover panel 19 in the internal space of the insulating block 11. These support spacers 20 are established parallel to the longitudinal side panels 21. The support spacers thus divide the internal space into a plurality of compartments. Each support spacer 20 is placed between two consecutive through holes 23. The panels and the support spacers are attached by any suitable means, for example, by screws, clasps or pins.

A gas-permeable heatproof lining is disposed in the box-section 11. The lining can be placed between each support spacer 20. This gas-permeable heatproof lining is preferably non-structural, for example, made of glass wool, cellulose wadding, perlite, aerogels or pyrogenic silica.

The bottom panel 17 comprises longitudinal rims 25 projecting from the longitudinal side panels 21. The bottom panel 17 also comprises a transverse rim 26 projecting from one of the transverse side panels 22. Battens 27 are supported by the rims 25, 26 of the bottom panel 17. In the example shown in FIG. 3, each end of the longitudinal rims 25 supports a respective batten 27 and a central portion of the transverse rim 26 supports a batten 27.

Numerous methods can be used to produce the cover panel 19. In the embodiment shown in FIG. 3, two plywood boards with different dimensions are stacked in order to form the cover panel 19. In one embodiment, not shown, the cover panel is produced by a plywood board, in which a countersink is produced.

As shown in FIG. 2, the anchoring components 15 are disposed at the corners of each insulating box-section 11. The side walls of each insulating box-section 11 comprise a rim. A batten 27 is disposed on each end of said rim. Each batten 27 of the insulating box-sections 11 engages with a respective anchoring component 15, with the same support component 15 engaging with the battens 27 of a plurality of adjacent insulating box-sections 11. The corners of the adjacent insulating box-sections 11 comprise a passage jointly forming a shaft in line with a corresponding fixing component 15. This shaft allows a nut to be screwed onto the stud of the fixing component 15. This shaft is filled with a heatproof lining 41 and is covered with a blanking plate 42, in order to form a flat surface with the cover panels of the insulating box-sections.

Figure 4:
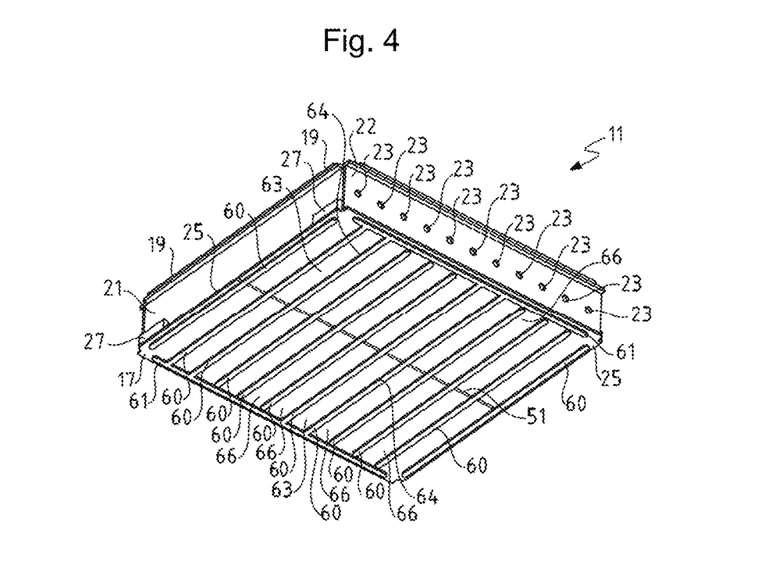
FIG. 4 is a bottom view of the insulating box-section of FIG. 3, as a cavalier perspective.
Figure 6:
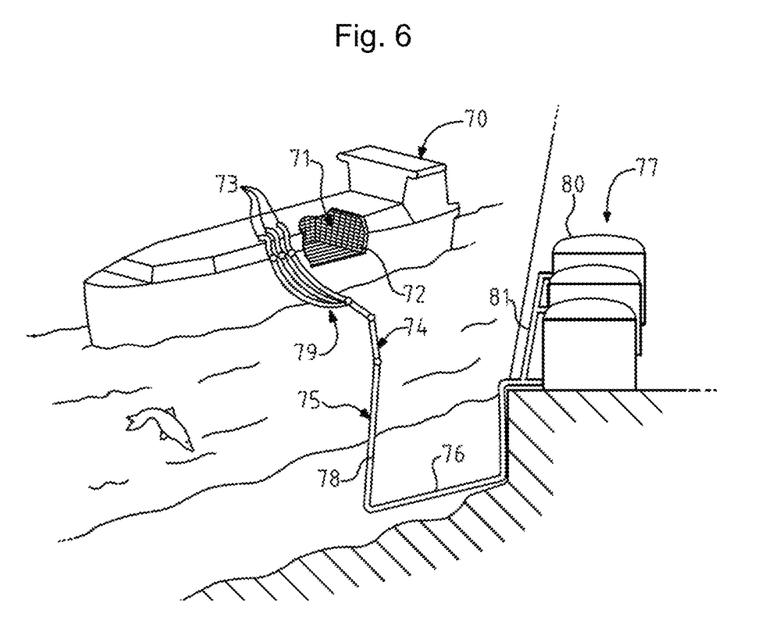
FIG. 6 is a cutaway schematic representation of a tank of an LNG tanker vessel and of a terminal for loading/offloading this tank.

FIGS. 2, 4 and 6 also show the sealant beads 60, 61, on which the insulating box-section 11 rests. These sealant beads 60, 61 are used to compensate for the gaps in the support wall relative to a flat reference surface. Preferably, a Kraft paper (not shown) is disposed on the support wall so that the sealant beads do not adhere to the support wall, in order to allow a slip clearance to be provided for the insulating box-section 11 relative to the support wall 2, 3, 4, 5.

The sealant beads 60, 61 comprise transverse beads 61 and longitudinal beads 60. The transverse beads 61 are disposed in line with the transverse side panels 22. The longitudinal beads 60 are disposed between the transverse beads 61, in line with the longitudinal side panels 21 and with the support spacers 20.

Figure 5:
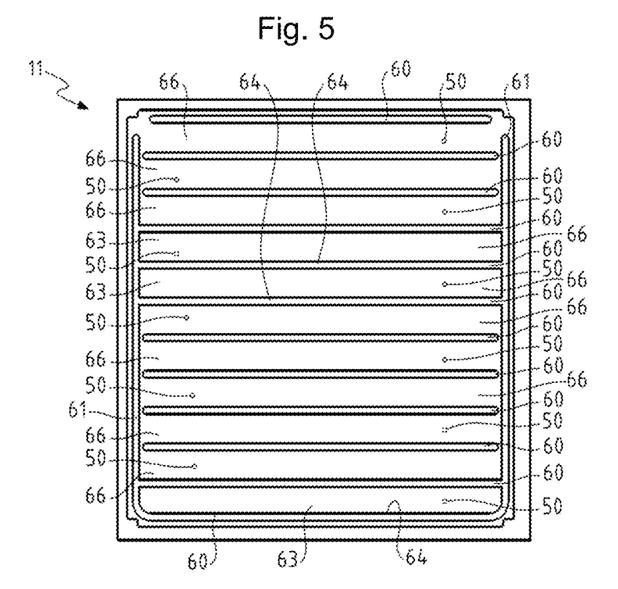
FIG. 5 is a bottom view of an insulating box-section according to a second embodiment.

Various possibilities exist for installing the sealant beads 60, 61. Preferably, the sealant beads 60, 61 are installed on an external face of the bottom panel 17 of the insulating box-section 11 before the insulating box-section 11 is installed on the support wall 2, 3, 4, 5 or 6, as shown in FIGS. 4 and 5. Alternatively, the sealant beads 60, 61 are firstly installed on the support wall 2, 3, 4, 5 or 6 before the installation of the insulating box-section 11.

The sealant beads 60, 61 can be disposed in three different manners. A first manner is to dispose the sealant beads 60, 61 in the form of closed outlines 64 on the support wall 2, 3, 4, 5 6 or on an external face of the bottom panel 17. These closed outlines 64 delimit, on the support wall or on the external face of the bottom panel 17, closed zones 63, and delimit confined spaces between the support wall 2, 3, 4, 5, 6 and the bottom panel 17, after the insulating box-section 11 has been installed on the support wall 2, 3, 4, 5, 6. A second manner is to dispose the sealant beads so as to leave a void between the sealant beads. Thus, before installing the insulating box-section 11, there is no closed outline 64. However, where the void between the sealant beads 60, 61 is small, this defines zones 66 that are likely to close due to creep. For example, a zone 66 exists between each pair of adjacent sealant beads 60. In this second manner of disposing the sealant beads, the void between the sealant beads 60 and 61 before installing the insulating box-section 11 is, for example, less than or equal to 12 mm. A third manner is to dispose part of the sealant beads 60, 61 in the form of closed outlines and another part by leaving voids between the sealant beads 60, 61.

In all cases, closed outlines 64 are likely to be formed, either as soon as the sealant beads 60, 61 are installed on the bottom panel 17, as shown in FIGS. 4 and 5, or on the support wall, as shown in FIG. 2, or following the crushing of the sealant beads during the installation of the insulating box-sections 11 on the support walls 2, 3, 4, 5 or 6. Indeed, the creep of the sealant during the installation of the insulating box-section 11 on the support wall is likely to fill the voids between two sealant beads 60, 61 and to lead to the formation of closed outlines 64. Closed outlines 64 formed by the sealant beads 60, 61 are shown by way of an illustration in FIGS. 4 and 5. In the event that it is the crushing of the sealant beads 60, 61 that produces the formation of one or more closed outlines 64, the position of these closed outlines 64 is not necessarily known in advance. Conversely, the closed outlines 64 formed before the installation of the insulating box-sections 11 on the support wall are therefore known in advance. In both cases, it is desirable for a connection to be provided for the gaseous phase between the confined space surrounded by a closed outline 64 and the heatproof lining inside the insulating box-section 11.

In order to allow gas to circulate in the confined spaces, in particular to prevent the pressure differentials or accumulations of chemical species that are dangerous since they are flammable and/or explosive, the bottom panel 17 comprises at least one through passage 50, 51 connecting an internal face of the bottom panel 17 to the external face, and leading into the closed zones 63 or the zones 66 that are likely to become closed.

According to a first embodiment, shown in FIGS. 3 and 4, the through passage assumes the shape of a groove 51. Thus, the groove 51 extends over the entire width of the bottom panel 17, i.e. from one edge to the other of the bottom panel 17 and partitions the bottom panel 17 into two equal parts. The groove 51 is disposed so as to pass through all the closed zones or zones that are likely to become closed and therefore all the confined spaces. In one embodiment, not shown, the insulating box-section further comprises a transverse support spacer that is established parallel to the transverse side panels over the entire width of the internal space of the box-section. The transverse support spacer can assume several shapes, for example, the shape of a comb. The transverse support spacer is then positioned so as not to completely cover the groove. For example, if the transverse support spacer is positioned at the centre of the insulating box-section 11, the groove 51 will be offset relative to this position. In another embodiment, not shown, the bottom panel comprises two through passages that assume the form of two grooves. The two grooves are disposed so as to pass through all the confined spaces. In an alternative embodiment, each groove passes through all the confined spaces. They can be parallel to each other, for example.

According to a second embodiment, shown in FIG. 5, the insulating box-section 11 comprises a plurality of through passages assuming the shape of holes 50, for example, of circular or of another shape. Some of these holes lead into the closed zones and therefore into the confined spaces. A hole 50 is associated with each closed zone 63 or with each zone 66 that is likely to become closed. The holes 50 are disposed in a staggered manner in the example shown, namely alternately in the right-hand part and the left-hand part of the compartments delimited by the support spacers 20. In one embodiment, not shown, each confined space is associated with at least two holes. This is particularly advantageous, particularly when the insulating box-section further comprises a transverse support spacer established parallel to the transverse side panels over the entire width of the internal space of the box-section. The transverse support spacer can assume a plurality of shapes, for example, the shape of a comb. Due to its position, the transverse support spacer can partition each compartment of the insulating box-section 11. The two holes of each zone located between two sealant beads 60 are then distributed on each side of said transverse support spacer. In another embodiment, not shown, a hole is placed so as to be at least partially passed through by a spacer and to lead into two confined spaces. In another embodiment, not shown, each closed zone 63 or each zone 66 that is likely to become closed is associated with a hole 50 placed at the centre of the zone or at another location, for example, randomly.

The sealed membrane can be produced in a different manner. In the example shown, the sealed membrane 12 of the tank wall 9 comprises a plurality of metal plates 13 juxtaposed one relative to the other with an overlap, for example. These metal plates 13 are preferably of rectangular shape. The metal plates 13 are welded together in order to provide the seal for the sealing membrane 12. Preferably, the metal plates 13 are made of stainless steel, for example, with a thickness of 1.2 mm.

In order to allow the sealed membrane to deform in response to the various stresses experienced by the tank, in particular in response to the thermal contraction resulting from loading the liquefied gas into the tank, the metal plates 13 comprise a plurality of corrugations 14 oriented towards the inside of the tank. More specifically, the sealed membrane 12 of the tank wall 9 comprises a first series of corrugations 14 and a second series of corrugations 14 forming an even rectangular pattern. As shown in FIG. 2, the first series of corrugations 14 is parallel to the edge 8 and the second series of corrugations 14 is perpendicular to the edge 8. Preferably, the corrugations 14 are established parallel to the edges of the rectangular metal plates. The distance between two successive corrugations 14 of a series of corrugations is of the order of 600 mm, for example.

The technique described above for producing a tank having a single sealed membrane can also be used in various types of tanks, for example, in order to form a double membrane tank for liquefied natural gas (LNG) in an onshore installation or in a floating structure, such as an LNG tanker vessel or the like. Within this context, it is possible to consider that the sealed membrane shown in the preceding figures is a secondary sealed membrane, and that a primary insulating barrier, as well as a primary sealed membrane, not shown, must still be added to this secondary sealed membrane. In this way, this technique can also be applied to the tanks that have a plurality of thermally insulating barriers and stacked sealed membranes.

With reference to FIG. 6, a cutaway view of an LNG tanker vessel 70 shows a sealed and insulated tank 71 of general prismatic shape mounted in the double hull 72 of the vessel. The tank 71 comprises a primary sealed barrier intended to be in contact with the LNG contained in the tank, a secondary sealed barrier arranged between the primary sealed barrier and the double hull 72 of the vessel, and two insulating barriers respectively arranged between the primary sealed barrier and the secondary sealed barrier and between the secondary sealed barrier and the double hull 72.

In a manner known per se, loading/offloading pipelines 73 disposed on the upper deck of the vessel can be connected, by means of suitable connectors, to a maritime or harbour terminal for transferring an LPG cargo from or to the tank 71.

FIG. 6 shows an example of a maritime terminal comprising a loading and offloading station 75, an underwater pipe 76 and an onshore installation 77. The loading and offloading station 75 is a fixed offshore installation comprising a movable arm 74 and a turret 78, which supports the movable arm 74. The movable arm 74 supports a bundle of insulated flexible hoses 79 that can be connected to the loading/offloading pipelines 73. The orientable movable arm 74 adapts to all forms of LNG tankers. A connection pipe, not shown, extends inside the turret 78. The loading and offloading station 75 allows the vessel 70 to be loaded and offloaded from or to the onshore installation 77, which comprises liquefied gas storage tanks 80 and connection pipes 81 connected by the underwater pipe 76 to the loading and offloading station 75. The underwater pipe 76 allows the liquefied gas to be transferred between the loading and offloading station 75 and the onshore installation 77 over a considerable distance, for example, 5 km, which enables the vessel 70 to be kept at a considerable distance from the shore during the loading and offloading operations.

In order to generate the pressure required to transfer the liquefied gas, pumps on board the vessel 70 and/or pumps equipping the onshore installation 77 and/or pumps equipping the loading and offloading station 75 are used.

Even though the invention has been described in relation to a plurality of specific embodiments, it is obvious that it is by no means limited thereto and that it comprises all the technical equivalents of the means described, as well as their combinations if they fall within the scope of the invention.

The use of the verb "comprise" or "include" and of its conjugated forms does not exclude the presence of other elements or other steps than those stated in a claim.

In the claims, any reference sign between brackets cannot be interpreted as a limitation of the claim.

The invention claimed is:

1. Sealed and thermally insulating tank for storing a low-temperature liquefied gas, integrated in a support structure, said tank comprising a tank wall fixed on a support wall of the support structure, the tank wall comprising, in the thickness direction, from the outside to the inside of the tank:
    a thermally insulating barrier retained on the support wall, and a sealed membrane supported by the thermally insulating barrier, the thermally insulating barrier comprising a plurality of juxtaposed insulating box-sections, one of said insulating box-sections comprising a cover panel forming a support surface for the sealed membrane, side panels and a bottom panel,
    the bottom panel and the cover panel being established parallel to each other and parallel to the support wall, the side panels connecting the bottom panel to the cover panel so as to delimit an internal space of the insulating box-section, the internal space being filled with a gas-permeable heatproof lining,
    wherein the side panels comprise first and second transverse side panels located at first and second longitudinal edges of the bottom panel and first and second longitudinal side panels, the transverse side panels being established perpendicular to the longitudinal side panels, the transverse side panels comprising through holes to allow gas to circulate between the internal space of the insulating box-section and an environment of the insulating box-section, the longitudinal side panels being continuous from the first transverse side panel to the second transverse side panel,
    wherein the bottom panel of the insulating box-section comes into abutment on the support wall by means of sealant beads disposed between the support wall and an external face of the bottom panel to compensate for gaps in the support wall relative to a reference plane, the sealant beads being disposed in the form of at least one closed outline delimiting at least one confined space between the support wall and the bottom panel of the insulating box-section, wherein the sealant beads comprise transverse beads and longitudinal beads, wherein the longitudinal beads are disposed perpendicular to the transverse beads between the transverse beads,
    the bottom panel comprising at least one through passage connecting an internal face of the bottom panel to the external face of the bottom panel, wherein at least a portion of the at least one through passage is located between two parallel edges of the bottom panel and away from said parallel edges of the bottom panel of the insulating box-section and wherein the at least a portion of the at least one through passage leads into said one or each of said at least one confined space delimited by the at least one closed outline to allow gas to circulate between said one or each of said at least one confined space and the internal space of the insulating box-section.

2. Tank according to claim 1, wherein the transverse beads are disposed in line with the transverse side panels.

3. Tank according to claim 2, wherein the longitudinal beads are disposed in line with the longitudinal side panels.

4. Tank according to claim 1, wherein said insulating box-section further comprises support spacers disposed in the internal space in order to divide the internal space into a plurality of compartments, the support spacers being established parallel to the longitudinal side panels, a support spacer being placed between two consecutive through holes.

5. Tank according to claim 4, wherein the longitudinal beads are disposed in line with the support spacers.

6. Tank according to claim 1, wherein the at least one through passage comprises a groove passing through the one or each confined space.

7. Tank according to claim 6, wherein the groove extends over an entire width of the bottom panel.

8. Tank according to claim 6, wherein the groove extends parallel to the transverse side panels and is disposed so as to partition the bottom panel into two equal parts.

9. Tank according to claim 6, wherein the width of the groove is between 2 and 12 mm.

10. Tank according to claim 1, wherein the bottom panel comprises a plurality of through passages assuming the shape of holes.

11. Tank according to claim 10, wherein at least one of said holes leads into each confined space.

12. Tank according to claim 10, wherein the diameter of said holes is between 15 and 30 mm.

13. Tank according to claim 1, wherein the thermally insulating barrier is a secondary thermally insulating barrier and the sealed membrane is a secondary sealed membrane, the tank wall further comprising a primary thermally insulating barrier disposed on the secondary sealed membrane and a primary sealed membrane supported by said primary thermally insulating barrier.

14. Insulating box-section for a sealed and thermally insulating tank for storing a low-temperature liquefied gas, said insulating box-section comprising a cover panel, side panels and a bottom panel and assuming the general shape of a rectangular parallelepiped, the bottom panel and the cover panel being established parallel to each other, the side panels connecting the bottom panel to the cover panel so as to delimit an internal space of the insulating box-section, the internal space being filled with a gas-permeable heatproof lining, wherein the side panels comprise first and second transverse side panels located at first and second longitudinal edges of the bottom panel and first and second longitudinal side panels, the transverse side panels being established perpendicular to the longitudinal side panels, the transverse side panels comprising through holes to allow a gas to circulate between the internal space of the insulating box-section and an environment of the insulating box-section, the longitudinal side panels being continuous from the first transverse side panel to the second transverse side panel, wherein sealant beads are disposed on an external face of the bottom panel, the sealant beads being arranged in the form of at least one closed outline delimiting at least one closed zone on the external face, wherein the sealant beads comprise transverse beads and longitudinal beads, wherein the longitudinal beads are disposed perpendicular to the transverse beads between the transverse beads, the bottom panel comprising at least one through passage connecting an internal face of the bottom panel to the external face of the bottom panel, wherein at least a portion of the at least one through passage is located between two parallel edges of the bottom panel and away from said parallel edges of the bottom panel and wherein the at least one through passage leads into said one or each of said at least one closed zone delimited by the at least one closed outline.

15. Insulating box-section according to claim 14, wherein the at least one through passage comprises a groove passing through the one or each closed zone.

16. Insulating box-section according to claim 14, wherein the bottom panel comprises a plurality of through passages assuming the shape of holes.

17. Insulating box-section according to claim 16, wherein at least one of said holes leads into each closed zone.

18. Vessel for transporting a low-temperature liquefied gas, the vessel comprising a hull and a tank according to claim 1 disposed in the hull.

19. Transfer system for a low-temperature liquefied gas, the system comprising a vessel according to claim 18, insulated pipelines arranged so as to connect the tank installed in the hull of the vessel to a floating or onshore storage installation and a pump for inducing a flow of low-temperature liquefied gas through the insulated pipelines, from or to the floating or onshore storage installation, to or from the tank of the vessel.

20. Method for loading or offloading a vessel comprising: routing a low-temperature liquefied gas through insulated pipelines, from or to a floating or onshore storage installation, to or from the tank of the vessel according to claim 18.

21. Tank according to claim 9 wherein the width of the groove is between 4 and 8 mm.

22. Tank according to claim 12 wherein the diameter of said holes is between 25 and 30 mm.

* * * * *